United States Patent [19]
McFadden

[11] Patent Number: 5,868,034
[45] Date of Patent: Feb. 9, 1999

[54] SHIFTING APPARATUS FOR CONTROLLING A TRANSMISSION SHIFTER IN A VEHICLE

[76] Inventor: Patrick A. McFadden, 255 Woodside Dr., Pataskala, Ohio 43062

[21] Appl. No.: 841,929

[22] Filed: Apr. 8, 1997

[51] Int. Cl.$^6$ ................................................ F16H 59/04
[52] U.S. Cl. ........................ 74/335; 74/128; 74/473.12; 74/473.18; 74/336 R
[58] Field of Search ................................ 74/335, 336 R, 74/337, 337.5, 473.18, 473.12, 128

[56] References Cited

U.S. PATENT DOCUMENTS

| | | | |
|---|---|---|---|
| 2,248,564 | 7/1941 | Wood | 74/473.12 X |
| 3,728,908 | 4/1973 | Bieber | 74/473.18 X |
| 4,873,891 | 10/1989 | Guanciale | 74/336 R X |
| 4,960,008 | 10/1990 | Yen et al. | 74/473.18 |
| 5,471,894 | 12/1995 | McFadden | 74/336 R |
| 5,537,885 | 7/1996 | Thomas | 74/335 |

*Primary Examiner*—Rodney H. Bonick
*Assistant Examiner*—Sherry Lynne Estremsky
*Attorney, Agent, or Firm*—Mueller and Smith, LPA

[57] ABSTRACT

In the present invention, a single cylinder or solenoid, ratchet-action, three speed actuator is used on an in-line shifter which actuator can be controlled by a button, single rpm switch, timer or a multiple number of rpm switches, or timers with a special controller. In-line shifters can control forward or reverse pattern transmissions. The pattern for a three-speed forward shifting transmission is first gear, second gear, third gear, neutral, reverse, and park. The pattern for a three-speed reverse shifting transmission is third gear, second gear, first gear, neutral, reverse, and park. A shifter for a forward pattern transmission must be pushed or pulled in a forward direction to shift to the next higher gear, and a shifter for a reverse pattern transmission must be pushed or pulled in a rearward direction to shift to the next higher gear. The handle of an in-line shifter travels in an arc through these patterns. The present invention includes an arc accommodating ratchet action mechanism with a single cylinder or solenoid that controls an in-line shifter that controls forward gear changes in a drag race vehicle with a forward or reverse pattern three speed transmission.

20 Claims, 11 Drawing Sheets

SHIFTING APPARATUS FOR CONTROLLING A TRANSMISSION SHIFTER IN A VEHICLE

CROSS-REFERENCE TO RELATED APPLICATIONS

None.

STATEMENT REGARDING FEDERALLY SPONSORED RESEARCH

Not applicable.

BACKGROUND OF THE INVENTION

The present invention relates to a shifting apparatus for controlling a transmission in a vehicle and, more particularly, to controlling an in-line shifter that controls the transmission of a drag race vehicle.

In the sport of automotive drag racing (which includes, drag racing, monster truck racing, mud racing, sand racing, hill racing, and the like), automatic transmissions are converted with manual shift valve bodies with transbrakes (transmission brakes). The transbrake is used to hold the vehicle on the starting line through a solenoid attached to the valve body. Some vehicles are provided with a "roll control" solenoid that locks the brakes on the vehicle, acting much the same manner as a transbrake. These solenoids are activated by a hold button, most often found on the steering wheel. A shifter is connected through a cable to the transmission controlling the valve body. The shifter is controlled manually by the driver when the tachometer reaches the rpm (revolutions per minute) level desired by the driver. The shifter also can be controlled by a pneumatic cylinder or an electric solenoid, thus freeing the driver's hands. Manufacturers now offering this type of shifter control include Shifnoid (Columbus, Ohio), Dixie (Boone, N.C.), Dedenbear (Pleasant Hill, Calif.), and Advance Control Devices (Alburtis, Pa.). The cylinder or solenoid is electronically connected through a control valve or a relay that is activated by a button or an "rpm switch". This rpm switch is preset at the desired shift level. The shifter control is activated each time the desired rpm level is reached.

A multiple number of cylinders or solenoids can be attached to an in-line shifter, each activating each shift or gear change. Manufacturers of this type of shifter control are Shifnoid and Advanced Control Devices (see U.S. Pat. No. 5,537,885). A special controller must activate this multiple cylinder or solenoid type of shifter control (see U.S. Pat. No. 5,471,894). Shifnoid is one manufacture of this type of special controller. Alternatively, a single cylinder or solenoid can be attached to a ratchet shifter controlling a multiple number of shifts at one rpm level with an rpm switch or a multiple number of rpm levels with a special controller (see U.S. Pat. No. 5,448,925). Shifnoid, Advance Control Devices and Dixie are manufactures of cylinder or solenoid shifter controls for ratchet shifters.

BRIEF SUMMARY OF THE INVENTION

In the present invention, a single cylinder or solenoid, ratchet-action, three speed actuator is used on an in-line shifter which actuator can be controlled by a button, single rpm switch, timer or a multiple number of rpm switches, or timers with a special controller. In-line shifters can control forward or reverse pattern transmissions. The pattern for a three-speed forward shifting transmission is first gear, second gear, third gear, neutral, reverse, and park. The pattern for a three-speed reverse shifting transmission is third gear, second gear, first gear, neutral, reverse, and park. A shifter for a forward pattern transmission must be pushed or pulled in a forward direction to shift to the next higher gear, and a shifter for a reverse pattern transmission must be pushed or pulled in a rearward direction to shift to the next higher gear. The handle of an in-line shifter travels in an arc through these patterns. The present invention includes an arc accommodating ratchet action mechanism with a single cylinder or solenoid that controls an in-line shifter that controls forward gear changes in a drag race vehicle with a forward or reverse pattern three speed transmission.

The drawings will be described in detail below.

DETAILED DESCRIPTION OF THE INVENTION

Figure 1:
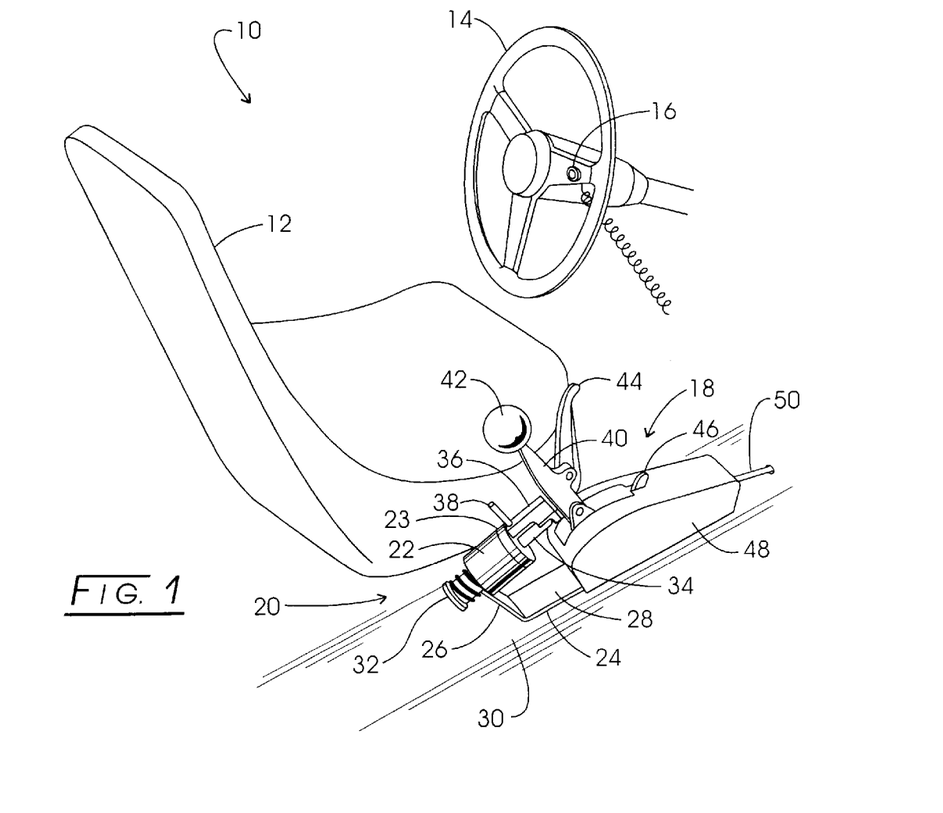
FIG. 1 is a perspective view showing the cockpit environment of a drag race vehicle with an in-line shifter and solenoid bolt actuator.
Figure 2:
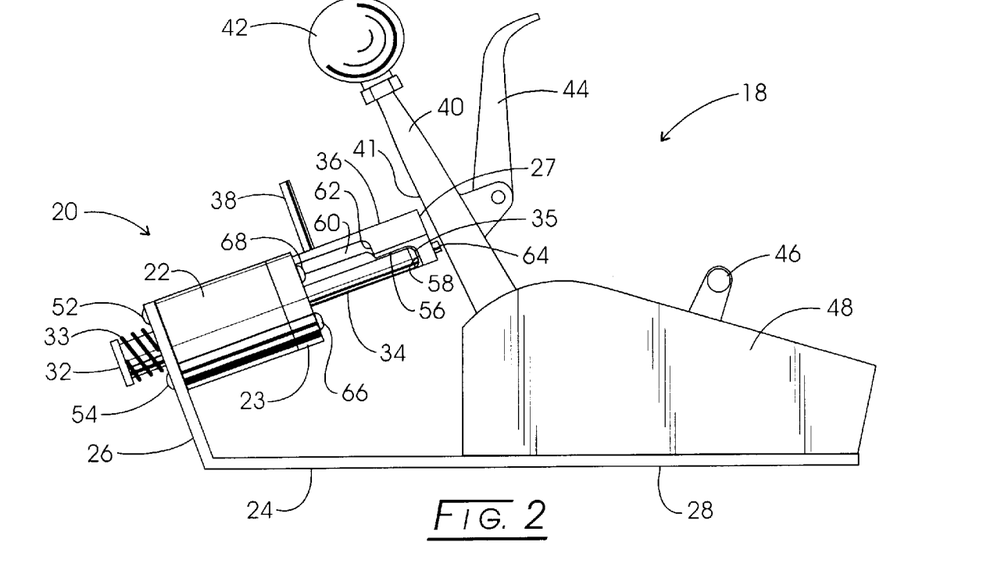
FIG. 2 is a side view of a forward pattern shifter in first gear with a solenoid bolt actuator attached.

Cockpit environment 10 is illustrated generally in FIGS. 1 and 2, having seat 12, steering wheel 14 with hold button 16, and forward pattern shifter 18 with solenoid bolt actuator assembly 20 of the present invention. Solenoid 22 of actuator assembly 20 is attached to upper section 26 of bracket 24 by screws 52 and 54. Lower section 28 of bracket 24 is mounted between shifter 18 and floor or mounting surface 30. Shifter 18 has upstanding handle 40 with knob 42 for shifting the shifter 18 manually. Also attached to handle 40 is lever 44 that allows shifter handle 40 to move from park to the drive gears and back to park. Shifter 18 has cover 48 and lever 46 that serves as a reverse lock out preventing the driver from shifting into reverse gear while in a forward gear. Shifter 18 is connected to the transmission by cable 50. The pattern of shifter 18 starting from the most forward position is park, reverse, neutral, third gear, second gear, and first gear.

Figure 6:
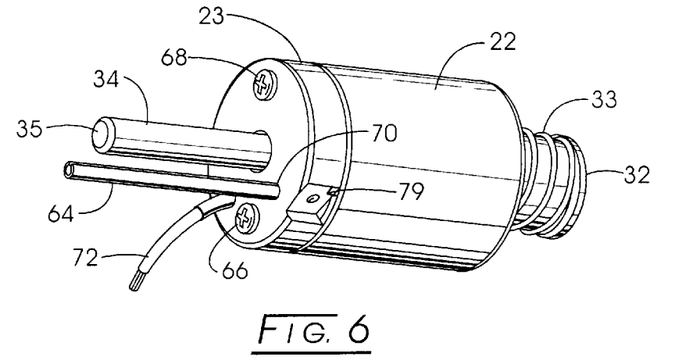
FIG. 6 is a perspective view of the solenoid and cap of the solenoid bolt actuator.
Figure 7:
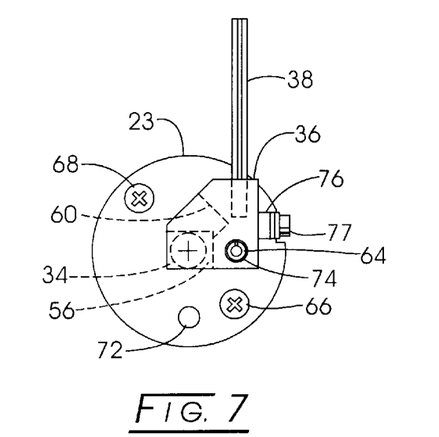
FIG. 7 is an end view of the solenoid bolt actuator in the first gear position.

Solenoid 22 includes cap 23 attached by screws 66 and 68, piston or plunger 32, and rod 34. Rod 34 is threaded into plunger 32 (not shown). Plunger 32 is retracted by spring 33 to its rearward position, as shown in FIG. 2. Bolt 36 slides and rotates on pin 64. Pin 64 is pressed into hole 70 in cap 23, as shown in FIG. 6. The longitudinal axis of pin 64 is aligned parallel with the longitudinal axis of rod 34. When bolt actuator 26 is in its rearward first gear position or cocked position, as shown in FIG. 2, rod 34 of solenoid 22 is in slot 56 of bolt actuator 26, as shown in FIG. 7.

Figure 3:
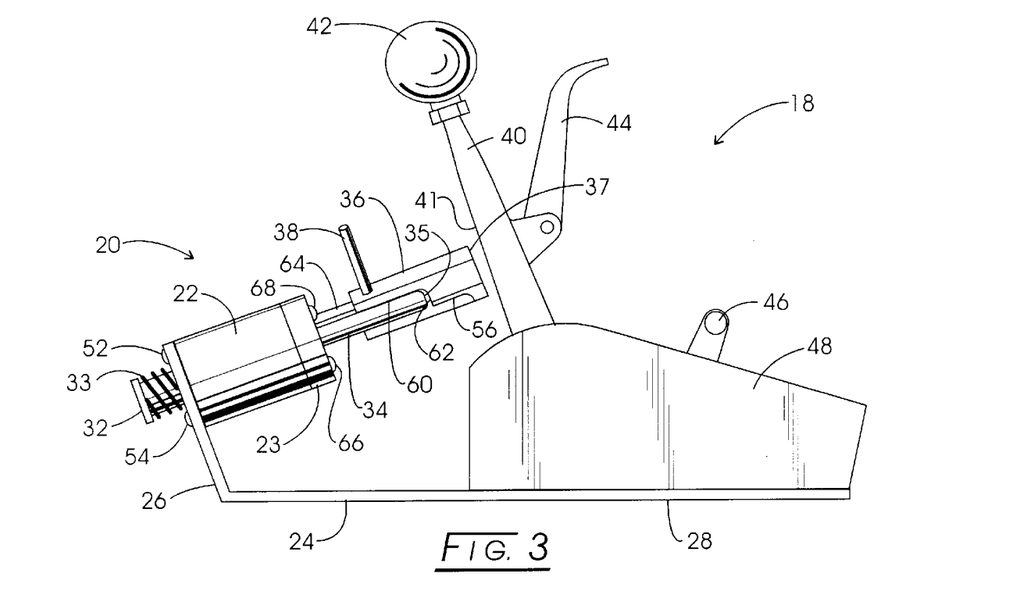
FIG. 3 is a side view of a shifter actuated by the solenoid bolt actuator to second gear.
Figure 4:
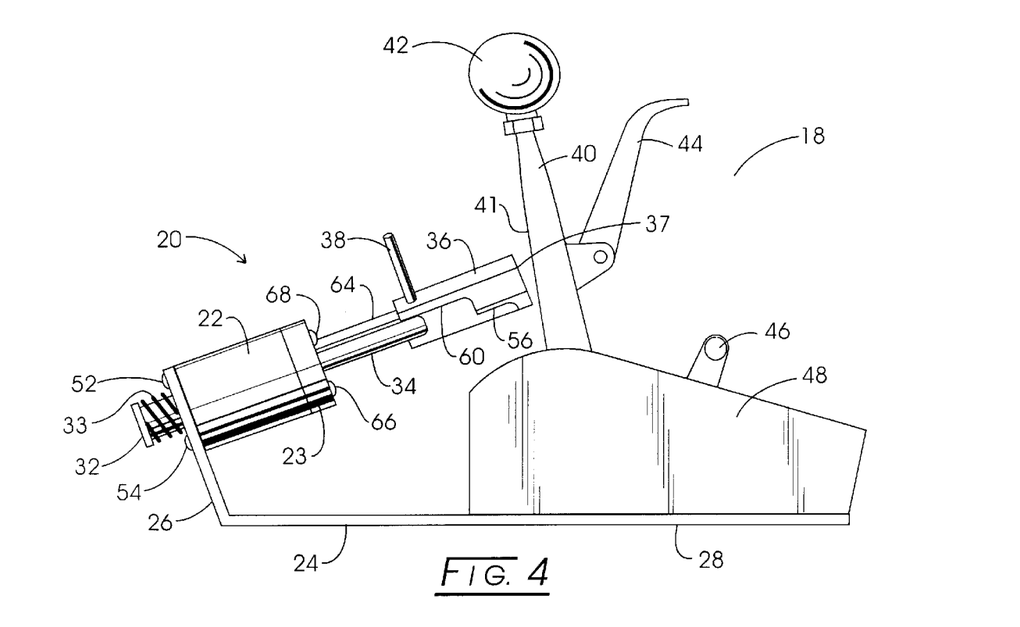
FIG. 4 is a side view of a shifter actuated by the solenoid bolt actuator to third gear.
Figure 5:
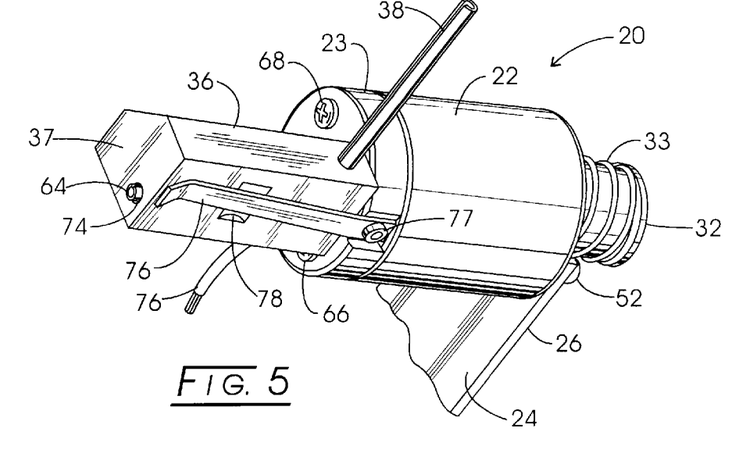
FIG. 5 is a perspective view of the solenoid bolt actuator.
Figure 8:
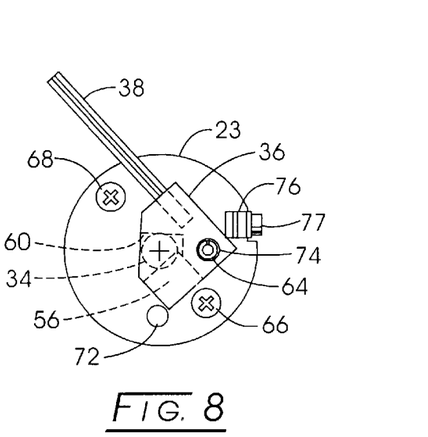
FIG. 8 is an end view of the solenoid bolt actuator in the second or third gear position.

For a forward shifting valve body transmission, shifter handle 40 has to be pushed forward with bolt actuator assembly 20. This is achieved when solenoid 22 is activated. By applying voltage to wire 72 (see FIGS. 5 and 6), solenoid 22 actuates, pushing tip 35 of rod 34 into surface 58 of slot 56 (see FIGS. 3, 4, 7, and 8, also), pushing bolt 36 forward contacting surface 41 of handle 40 with surface 37. Surface 37 slides on surface 41 allowing handle 40 to travel in an arc. Tip 35 of rod 34 travel is restricted by the length of travel of the plunger 32 in solenoid 22. The distance of the travel of tip 35 is the same as the travel of the shifter handle 40 to second gear. Flat spring 76 is mounted to cap 23 by screw 77, as shown in FIG. 5. Cap 23 has flat 79 with threaded hole (see FIG. 6) to receive flat spring 76. Flat spring 76 contacts detent 78 in bolt 36 when shifter handle 40 reaches second gear. When shifter 18 engages the transmission to second gear, solenoid 22 deactivates, spring 33 retracting rod 34 and plunger 32. Flat spring 76 in detent 78 restricts bolt 36 from also retracting with rod 34. When plunger 32 and rod 34 retract, bolt 36 rotates or ratchets about pin 64 in hole 74 into slot 60 of bolt 36, as shown in FIG. 8. Flat spring 76 also biases bolt 36 in its direction of rotation or movement. At this point, bolt 36 is in the second gear position ready to shift the shifter to third gear, as shown in FIG. 3.

By applying voltage to wire 72 for a second time, solenoid 22 actuates again, pushing tip 35 of rod 34 into surface 62 of slot 60, pushing bolt 36 forward contacting surface 41 of handle 40 with surface 37. When shifter 18 engages the transmission to third gear, solenoid 22 deactivates, with spring 33 retracting rod 34 and plunger 36 for a second time. At this point, bolt 36 is in the third gear position, as shown in FIG. 4, ready to be cocked back to the first gear position.

Pin or handle 38 is used to cock bolt 36 back to the first gear position. By rotating handle 38 in the opposite direction of flat spring 76 bias and pulling back tip 34 is relocated in slot 56 of bolt 36. At this point, shifter handle 40 can be pulled back to the first gear position manually, ready to be shifted by the solenoid bolt actuator assembly 20 again, as shown in FIG. 2.

It will be noted that the solenoid bolt actuator assembly 20 is designed for a three speed transmission, however, other slots can be added to bolt actuator 36 to ratchet as many times bolt 36 as it has slots. This enables solenoid bolt actuator 20 to shift, for example, a four, five, six, or other multiple speed transmission.

Figure 9:
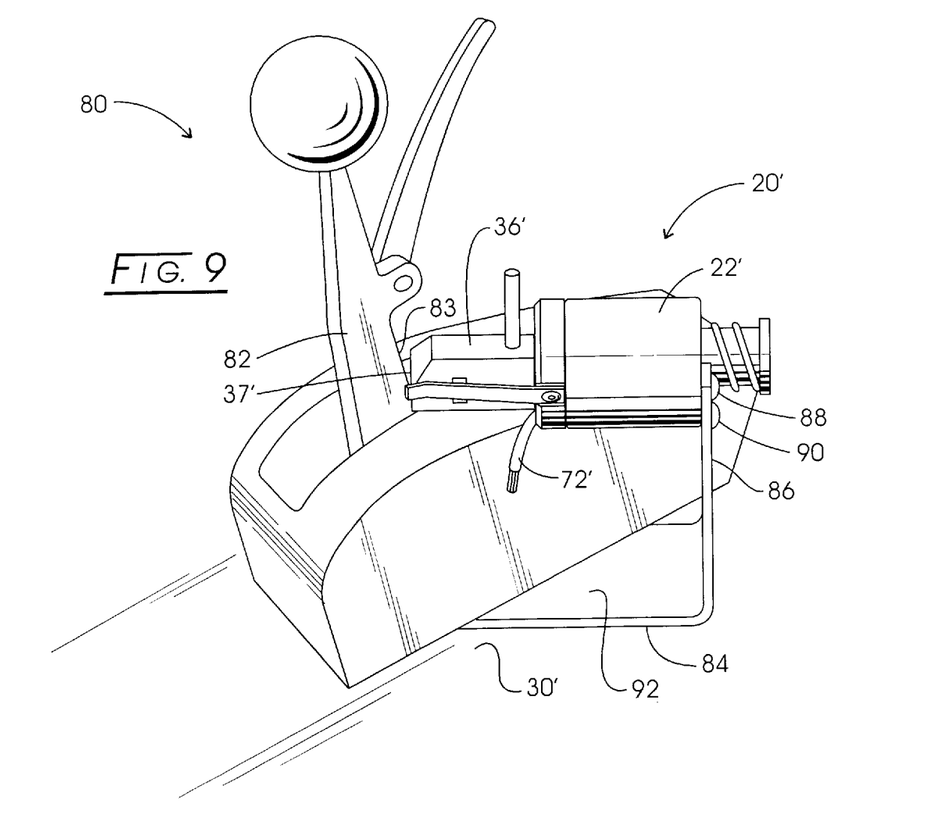
FIG. 9 is a perspective view of a reverse pattern shifter with a solenoid bolt actuator attached.

FIG. 9 shows shifter 80 with solenoid bolt actuator assembly 20' mounted to bracket 84 for a reverse pattern valve body transmission. Thus, shifter 80 is a reverse pattern shifter. The pattern of shifter 80, starting from the most forward position, is park, reverse, neutral, first gear, second gear, and third gear. With this reverse pattern, shifter handle 82 must be pushed backwards with bolt actuator assembly 20'. This is accomplished by mounting solenoid bolt actuator assembly 20' at an angle with respect to the plane the shifter handle 82 creates when it is shifted, i.e., off to the side (e.g., the right side) of the shifter 80 its handle 82.

Solenoid bolt actuator 20' mounts to upper section 86 of bracket 84 by screws 88 and 90. Lower section 92 of bracket 84 is mounted between shifter 80 and the mounting surface 30'.

The angle-mounting of solenoid bolt actuator assembly 20' allows shifter handle 82 to move freely to the neutral, reverse and park positions without contacting the bolt 36' in the cocked (retracted) position. When shifter handle 80 is in the first gear position and bolt 36' is in its cocked position (as shown in FIG. 9), surface 37' of bolt 36' is aligned with surface 83 of shifter handle 82. When voltage is applied to wire 72', solenoid 22' actuates, pushing bolt 36' rearwardly into contact with handle 82 for shifting the transmission to the next gear. The solenoid bolt actuator assembly 20' shift action is the same as that of solenoid bolt actuator assembly 20 as shown in FIGS. 2, 3 and 4, previously described.

Figure 10:
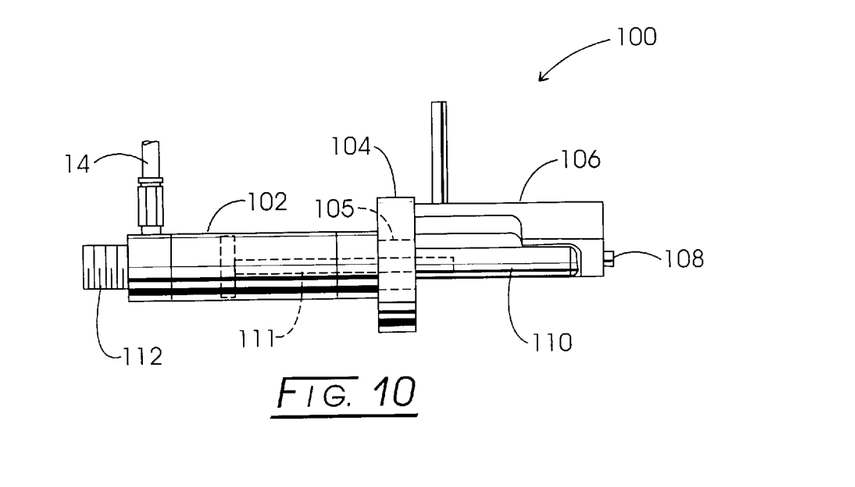
FIG. 10 is a side view of a pneumatic bolt actuator.

Shown in FIG. 10 is pneumatic bolt actuator 100. Cap 104 is threaded onto pneumatic cylinder 102 with internal threads 105. Bolt actuator 106 slides and rotates on pin 108, similar to bolt rotations as previously described. Rod 110 is attached to piston and rod 111 of pneumatic cylinder 102. Pneumatic cylinder 102 attaches to a bracket (not shown) by threads 112, replacing the solenoid 22 previously described. Pneumatic bolt actuator 100 is activated when air or $CO_2$ pressure is applied to line 114 which actuates pneumatic cylinder 102. Pneumatic cylinder 102 is a single-acting, spring-return push cylinder.

Figure 11:
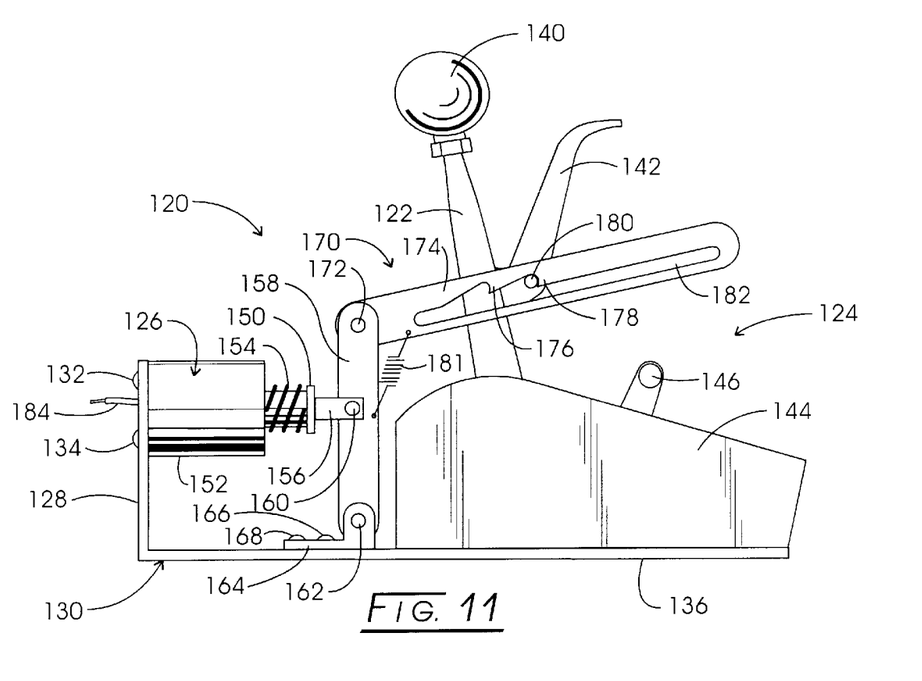
FIG. 11 is a side view of a reverse pattern shifter in first gear with a solenoid ratchet actuator attached.

Shown in FIG. 11 is solenoid ratchet actuator 120 that pulls handle 122 of reverse pattern shifter 124. Solenoid 126 of actuator 120 is connected to upper section 128 of bracket 130 by screws 132 and 134. Lower section 136 of bracket 130 is mounted between shifter 124 and the floor or mounting surface previously described.

Shifter 124 has upstanding handle 122 with knob 140 for shifting the shifter 124 manually. Also attached to handle 122 is lever 142 that allows shifter handle 122 to move from park to the drive gears and back to park. Shifter 124 has cover 144 and lever 146 that serves as a reverse lock-out. The pattern of shifter 124, starting from the most forward position, is park, reverse, neutral, first gear, second gear, and third gear.

Solenoid 126 comprises piston or plunger 150 and windings 152. Plunger 150 is retracted by spring 154 to its forward position. Connected to plunger 150 is clevis 156. Clevis 156 in turn is connected to pivot bar 158 with pin 160 through a hole in pivot bar 158. This hole is larger then pin 160 allowing for the arc travel of pivot bar 158. The lower section of bar 158 pivots about pin 162 of pivot mount 164. Mount 164 is connected to lower section 136 of bracket 130 by screws 166 and 168. The upper section of bar 158 is connected to ratchet mechanism 170 by pivot pin 172. Bar 174 of ratchet mechanism 170 pivots on pin 172, allowing for the arc travel of handle 122 of shifter 124. Bar 174 has teeth 176 and 178 that engage pawl or pin 180. Spring 181 holds pin 180 in contact with teeth 176 or 178. Pin 180 is an extension of the bolt that connects lever 142 to handle 122 of shifter 124. Slot 182 in bar 174 allows shifter handle 122 to move to the neutral, reverse, and park locations. When bar 174 is raised by the driver's hand, pin 180 aligns in slot 182 and, by pushing shifter handle 122 with knob 140, forward pin 180 moves forward in slot 182.

For a reverse shifting valve body transmission, shifter handle 122 is pulled rearwardly with ratchet actuator 120. This is achieved when solenoid 126 is activated. By applying voltage to wire 184, solenoid 126 actuates, pulling plunger 150 into windings 152. Plunger 150 pulls pivot bar 158 rearwardly through clevis 156, actuating ratchet mechanism 170.

Figure 12:
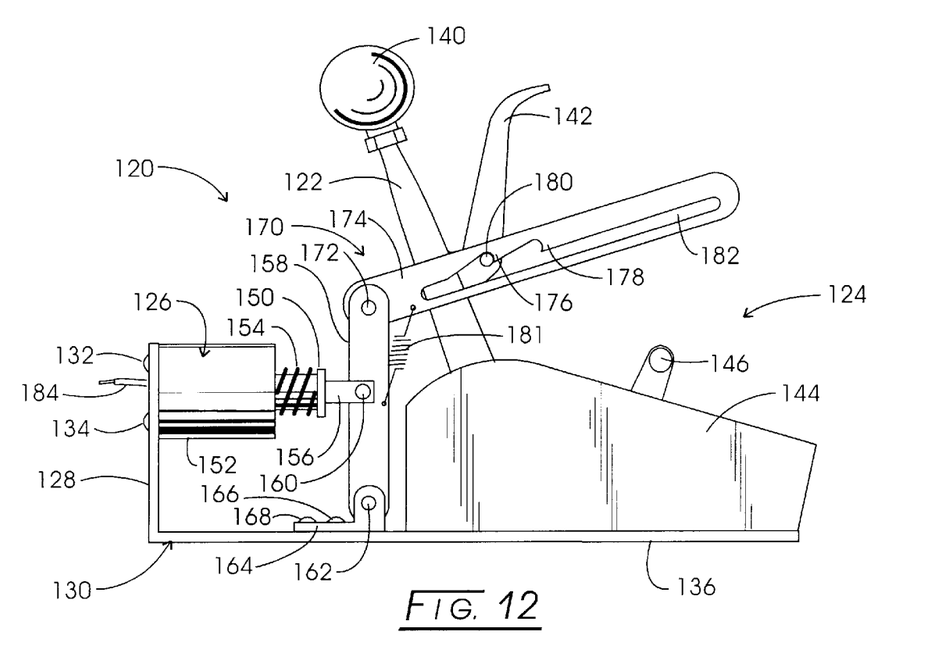
FIG. 12 is a side view of a shifter in FIG. 11 actuated by the solenoid ratchet actuator to second gear.

Shifter 124 is in the first gear position as shown in FIG. 11. Pawl or pin 180 is in contact with tooth 178 of bar 174. Shifter handle 122 is pulled to second gear with ratchet mechanism 170 when solenoid 126 is actuated. The distance shifter handle 122 travels into second gear is determined by the ratio of the pivot points in bar 158. When shifter 124 engages the transmission to second gear, solenoid 126 deactivates, retracting plunger 150 with spring 154. When plunger 150 retracts, ratchet mechanism moves tooth 176 into contact with pawl or pin 180 as shown in FIG. 12.

By applying voltage to wire 184 for a second time, solenoid 126 activates again. When solenoid 126 activates for a second time, the ratchet mechanism pulls shifter handle 122 to third gear in a similar fashion as that described above.

To return the shifter to the first gear position, the driver must lift up on bar 174, allowing the pawl or pin 180 to by-pass tooth 176 and, upon the driver releasing bar 174, pin 180 is caused to come into contact with tooth 178 through bias spring 181. Spring 181 may be necessary to hold bar 174 in position because of the extreme vibration in a drag race vehicle.

Figure 13:
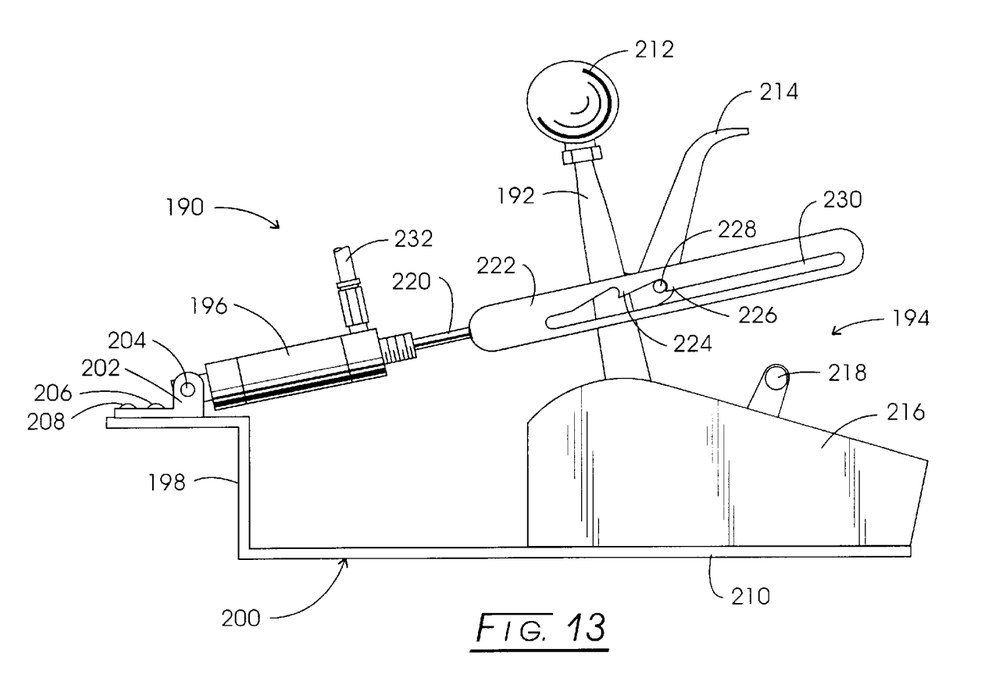
FIG. 13 is a side view of a reverse pattern shifter in first gear with a pneumatic ratchet actuator attached.

Shown in FIG. 13 is pneumatic ratchet actuator 190 that pulls handle 192 of reverse pattern shifter 194. Pneumatic cylinder 196 of actuator 190 is connected to upper section 198 of bracket 200 by pivot 202. Cylinder 196 is connected to pivot 202 by pin 204. Pivot 202 connects to upper section 198 of bracket 200 by screws 206 and 208. Lower section 210 of bracket 200 is mounted between shifter 194 and the floor or mounting surface as previously described.

Shifter 194 has upstanding handle 192 with knob 212 for shifting shifter 194 manually. Also attached to handle 192 is lever 214 that allows shifter handle 192 to move from park to the drive gears and back to park. Shifter 194 has cover 216 and lever 218 that serves as a reverse lock out. The pattern of shifter 194, starting from the most forward position, is park, reverse, neutral, first gear, second gear, and third gear.

Pneumatic cylinder 196 is a single-acting spring-return pull cylinder. Piston rod assembly 220 is connected to bar 222 of pneumatic ratchet actuator 190. Bar 222 and cylinder 196 pivot on pin 204, allowing for the arc travel of handle 122 of shifter 124. Bar 222 has teeth 224 and 226 that engage pawl or pin 228. Pin 228 is an extension of the bolt that connects lever 214 to handle 192 of shifter 194. Slot 230 in bar 222 allows shifter handle 192 to move to the neutral, reverse, and park locations. When bar 222 is raised by the driver's hand, pin 228 aligns in slot 230 and, by pushing shifter handle 192 with knob 212 forward, pin 228 moves forward in slot 230.

Shifter 194 is in the first gear position as shown in FIG. 13. Pawl or pin 228 is in contact with tooth 226 of bar 222.

Figure 14:
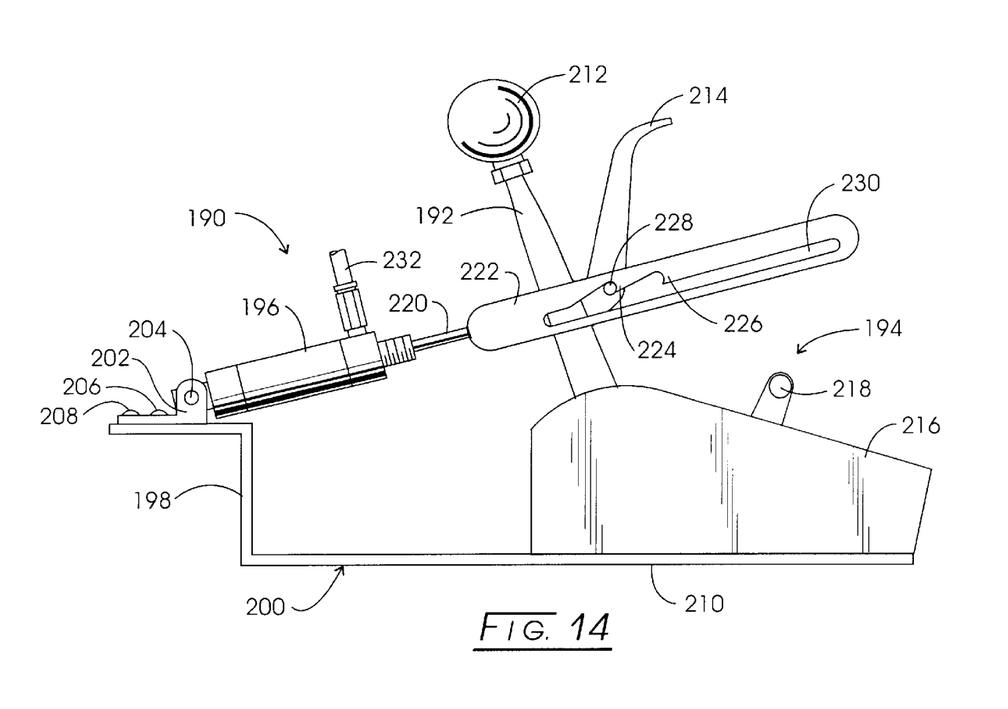
FIG. 14 is a side view of a shifter in FIG. 13 actuated by the pneumatic ratchet actuator to second gear.

Shifter handle 192 is pulled to second gear with ratchet actuator 190 when air or $CO_2$ is applied to line 232 of cylinder 196. The length of travel of cylinder 196 determines the distance shifter handle 192 travels into second gear. When shifter 194 engages the transmission to second gear, cylinder 196 deactivates, thus retracting piston rod 220 with its internal spring. When piston rod 220 retracts, ratchet actuator 190 moves tooth 224 into contact with pawl or pin 228, as shown in FIG. 14.

By applying air or $CO_2$ to line 232 for a second time, cylinder 196 activates again. When cylinder 196 activates for a second time, the ratchet mechanism pulls the shifter handle 192 to third gear in a similar fashion to that described above.

To return the shifter to the first gear position, the driver must lift up on bar 222 allowing the pawl or pin 228 to by-pass tooth 224 and, by the driver releasing the bar 222, pin 228 is caused to come in contact with tooth 226 through gravity.

Figure 15:
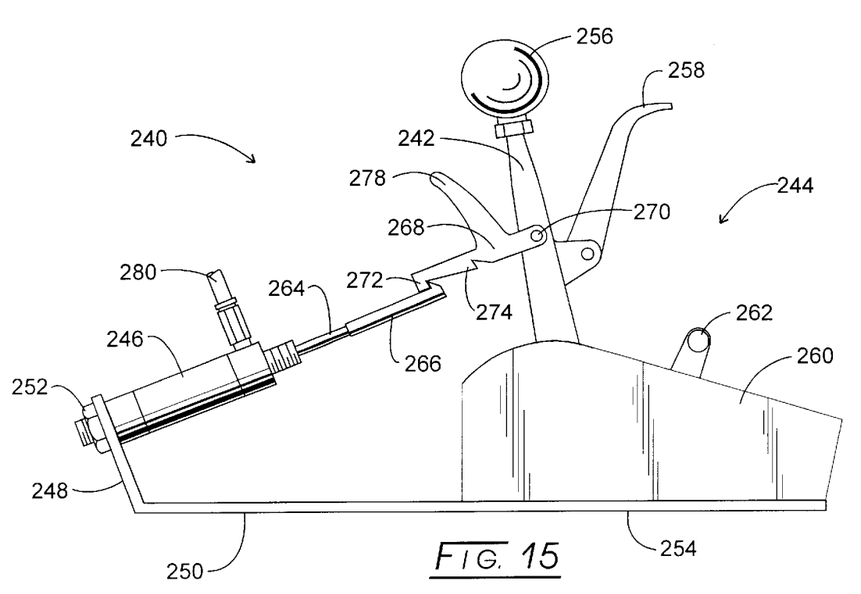
FIG. 15 is a side view of a reverse pattern shifter in first gear with an alternative pneumatic ratchet actuator attached.

Shown in FIG. 15 is an alternative pneumatic ratchet actuator 240 that pulls handle 242 of reverse pattern shifter 244. Pneumatic cylinder 246 of actuator 240 is connected to upper section 248 of bracket 250 by nut 252. Lower section 254 of bracket 250 is mounted between shifter 244 and the floor or mounting surface, as previously described.

Shifter 244 has upstanding handle 242 with knob 256 for shifting shifter 240 manually. Also attached to the handle 242 is lever 258 that allows shifter handle 242 to move from park to drive gears and back again. Shifter 244 has cover 260 and lever 262 that serves as a reverse lock out. The pattern of shifter 244, starting from the most forward position, is park, reverse, neutral, first gear, second gear, and third gear.

Pneumatic cylinder 246 is a single-acting spring-return pull cylinder. Piston rod assembly 264 is connected to pawl 266 of pneumatic ratchet actuator 240. Bar 268 pivots on pin 270 attached to shifter handle 242 allowing for the arc travel of handle 242 of shifter 244. Bar 268 has teeth 272 and 274 that engage pawl 266. To permit shifter handle 242 to move to the neutral, reverse and park location, bar 268 is raised by the driver's hand through handle 278.

Shifter 244 is in the first gear position as shown in FIG. 15. Pawl 266 is in contact with tooth 272 of bar 268. Shifter handle 242 is pulled to second gear with ratchet actuator 240 when air or $CO_2$ is applied to line 280 of cylinder 246. The length of travel of cylinder 246 determines the distance shifter handle 242 travels into second gear. When shifter 244 engages the transmission to second gear, cylinder 246 deactivates, thus retracting piston rod 264 by its internal spring. When piston rod 264 retracts, ratchet actuator 240 moves tooth 274 into contact with pawl 266.

Figure 16:
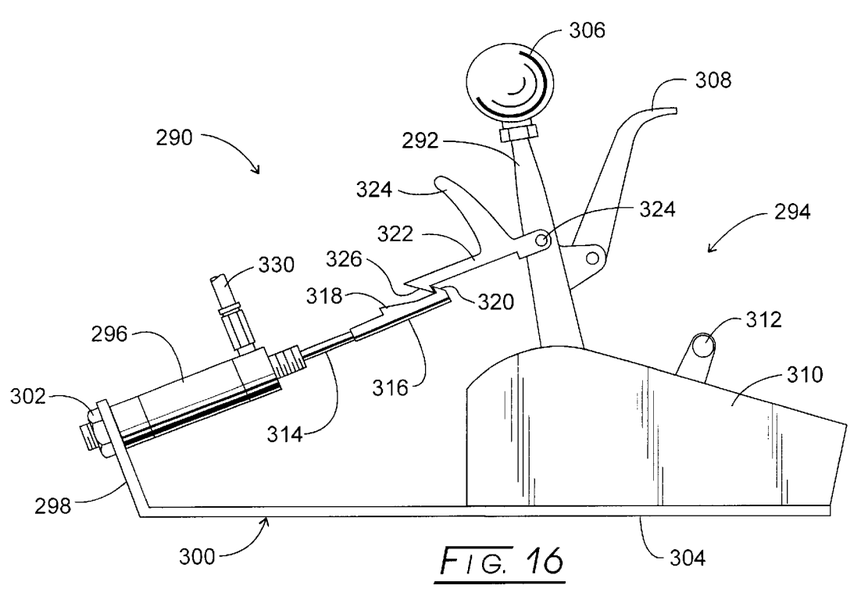
FIG. 16 is a side view of a reverse pattern shifter in first gear with a second alternative pneumatic ratchet actuator attached.

Shown in FIG. 16 is a second alternative pneumatic ratchet actuator 290 that pulls handle 292 of reverse pattern shifter 294. Pneumatic cylinder 296 of actuator 290 is connected to upper section 298 of bracket 300 by nut 302. Lower section 304 of bracket 300 is mounted between shifter 294 and the floor or mounting surface as previously described.

Shifter 294 has upstanding handle 292 with knob 306 for shifting the shifter 290 manually. Also attached to handle 292 is lever 308 that allows the shifter handle 292 to move from park to the drive gears and back to park. Shifter 294 has cover 310 and lever 312 that serves as a reverse lock out. The pattern of shifter 294, starting from the most forward position, is park, reverse, neutral, first gear, second gear, and third gear.

Pneumatic cylinder 296 is a single-acting spring-return pull cylinder. Piston rod assembly 314 is connected to tooth bar 316 of pneumatic ratchet actuator 290. Tooth bar has two teeth 318 and 320. Lever 322 pivots on pin 324 attached to shifter handle 292 allowing for the arc travel of handle 292 of shifter 294. Lever 322 has pawl 326 at its end. To permit shifter handle 292 to move to the neutral, reverse and park locations, lever 322 is raised by the driver's hand through handle 324.

Shifter 294 is in the first gear position as shown in FIG. 16. Pawl 326 is in contact with tooth 320 of bar 316. Shifter handle 292 is pulled to second gear with ratchet actuator 290 when air or $CO_2$ is applied to line 330 of cylinder 296. The length of travel of cylinder 296 determines the distance the shifter handle 294 travels into second gear. When shifter 294 engages the transmission to second gear, the cylinder 296 deactivates, thus retracting piston rod 314 by its internal spring. When piston rod 314 retracts, ratchet actuator 290 moves tooth 318 into contact with pawl 326.

Figure 17:
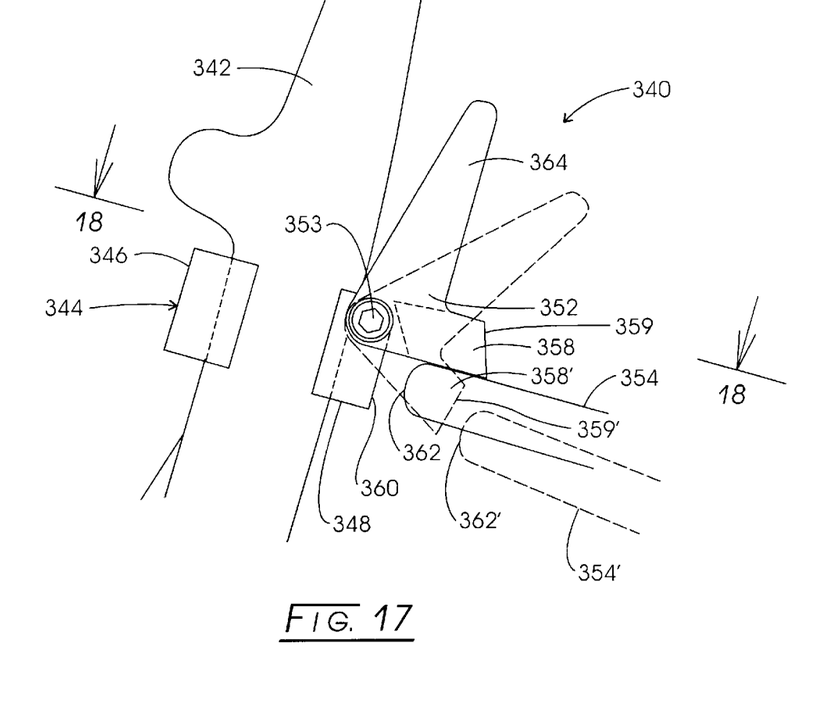
FIG. 17 is a side view of a forward pattern shifter handle with a third alternative embodiment attached.
Figure 18:
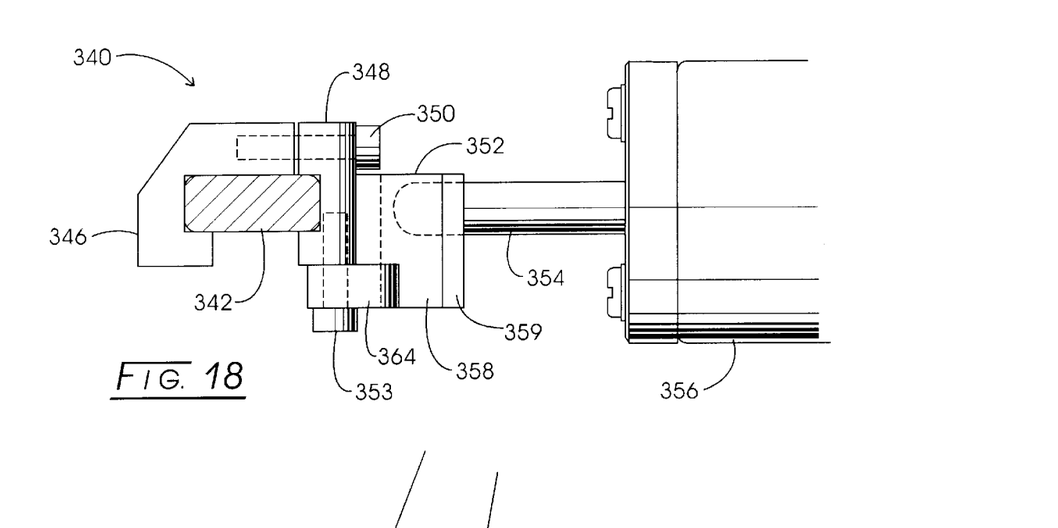
FIG. 18 is a sectional view along line 18—18 of FIG. 17.

Shown in FIGS. 17 and 18 is a third alternative ratchet actuator 340 connected to shifter handle 342 of forward pattern shifter. Actuator 340 is connected to handle 342 by clamp 344. Clamp 344 has two U-shaped brackets 346 and 348 which are connected by bolt 350. Lever 352 is connected to bracket 348 by pivot shoulder bolt 353. Solenoid 356 is directly in line with handle 342. Rod 354 of solenoid 356 supports tooth 358 of lever 352 when shifter is in first gear. When voltage is applied to solenoid 356, rod 354 contacts surface 360 of bracket 348 with its tip 362 shifting the shifter to second gear. When the shifter shifts to second gear, rod 354 of solenoid 356 retracts, allowing surface 359' of tooth 358' to align with tip 362' of rod 354'. When voltage is applied to solenoid 356 for a second time, rod 354' contacts surface 359' of tooth 358' with its tip 362' shifting the shifter to third gear. To return the handle to first gear, lever 352 must be rotated with handle 364 moving tooth 358 upwards. While rod 354' is shown displaced in FIG. 17, this is for clarity as shift handle 342 actually rotates so that rod 354 contacts it at the new angle shown for rod 354' (arc accomodation is achieved via lever 352).

Figure 19:
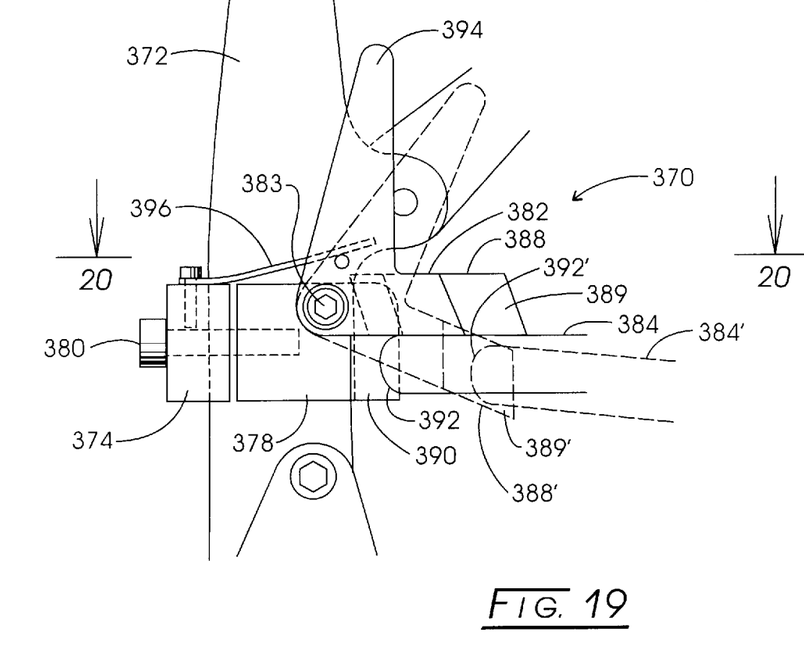
FIG. 19 is a side view of a reverse pattern shifter handle with a forth alternative embodiment attached.
Figure 20:
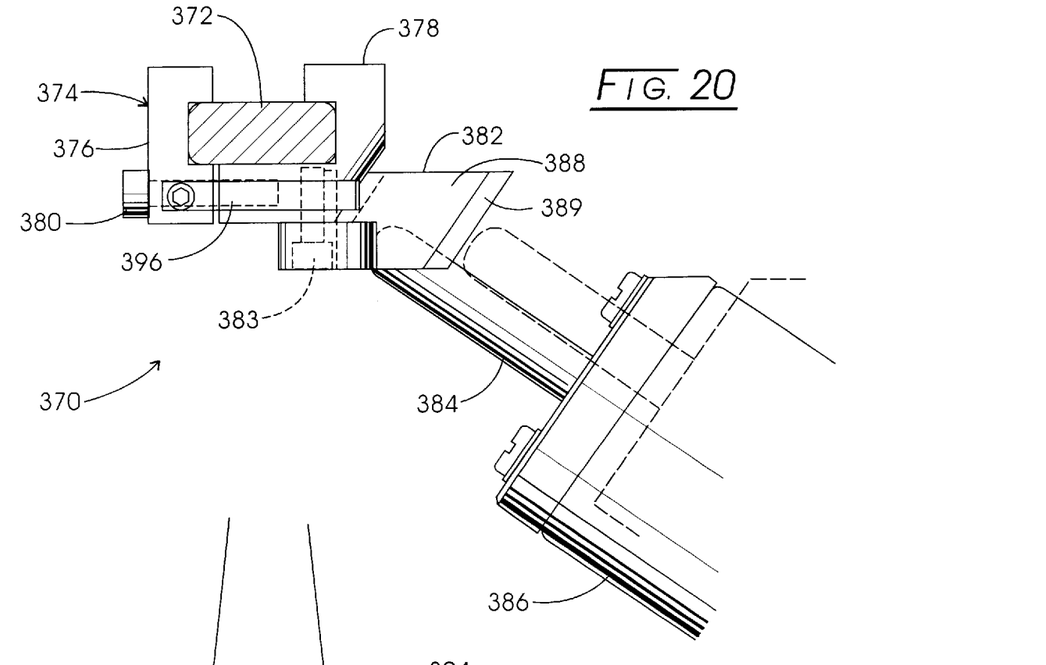
FIG. 20 is a sectional view along line 20—20 of FIG. 19.

Shown in FIGS. 19 and 20 are a forth alternative ratchet actuator 370 connected to shifter handle 372 of reverse pattern shifter. Actuator 370 is connected to handle 372 by clamp 374. Clamp 374 has two U-shaped brackets 376 and 378 which are connected by bolt 380. Lever 382 is connected to bracket 378 by pivot shoulder bolt 383. Solenoid 386 is positioned at an angle with respect to handle 372 to allow handle 372 to by-pass rod 384 when shifting to neutral, reverse, and park. Rod 384 of solenoid 386 supports tooth 388 of lever 382 when the shifter is in first gear. When voltage is applied to solenoid 386, rod 384 contacts surface 390 of bracket 388 with its tip 392 shifting the shifter to second gear. When the shifter shifts to second gear, rod 384 of solenoid 386 retracts, allowing surface 389' of tooth 388' to align with tip 392' of rod 384'. When voltage is applied to solenoid 386 for a second time, rod 384' contacts surface 389' of tooth 388' with its tip 392' shifting the shifter to third gear. To return the handle to first gear, lever 382 must be rotated with handle 394 moving tooth 388 upward. Spring 396 biases lever 382 downwardly. Spring 396 may be necessary to hold lever 382 in position because of the extreme vibration in a drag race vehicle. The displacement of rod 384 again is for clarity as was explained in connection with FIG. 17.

Figure 21:
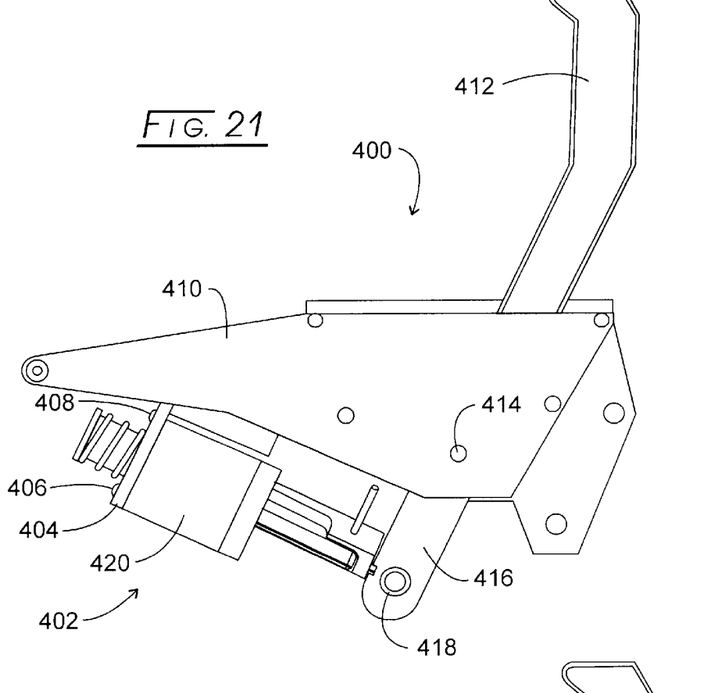
FIG. 21 is a side view of a side mount shifter with a solenoid bolt actuator attached.

Shown in FIG. 21 is forward pattern side mount shifter 400 with solenoid bolt actuator assembly 402. Actuator 402 assembly is mounted to shifter 400 by bracket 404 by screws 406 and 408. Bracket 404 is connected to shifter base 410. Handle 412 shifts the shifter in a forward pattern. Shifter handle 412 extends through the shifter and rotates about pivot pin 414. Shifter handle extension 416 has contact bolt 418 that pushes handle 412 forward when voltage is applied to solenoid 420. The action of bolt actuator assembly 402 is the same as bolt actuator assembly 20 in FIGS. 2, 3, and 4.

Figure 22:
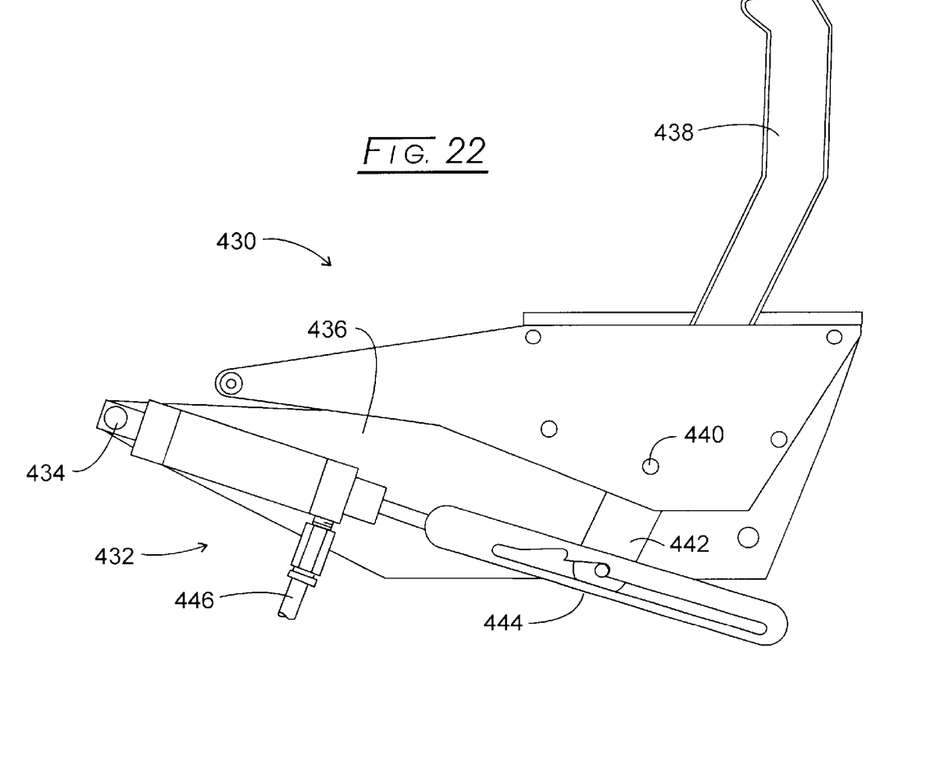
FIG. 22 is a side view of a side mount shifter with a pneumatic ratchet actuator attached.

Shown in FIG. 22 is reverse pattern side mount shifter 430 with pneumatic ratchet actuator 432. Actuator 432 is mounted to shifter 430 by pivot 434. Pivot 434 is connected to shifter base 436. Handle 438 shifts the shifter in a reverse pattern. Shifter handle 438 extends through the shifter and rotates about pivot pin 440. Shifter handle extension 442 has pawl or pin 444 that pulls the handle rearwardly when air or $CO_2$ is applied to line 446 of pneumatic actuator 432. The action of pneumatic actuator 432 is the same as pneumatic actuator in FIGS. 13 and 14.

Figure 23:
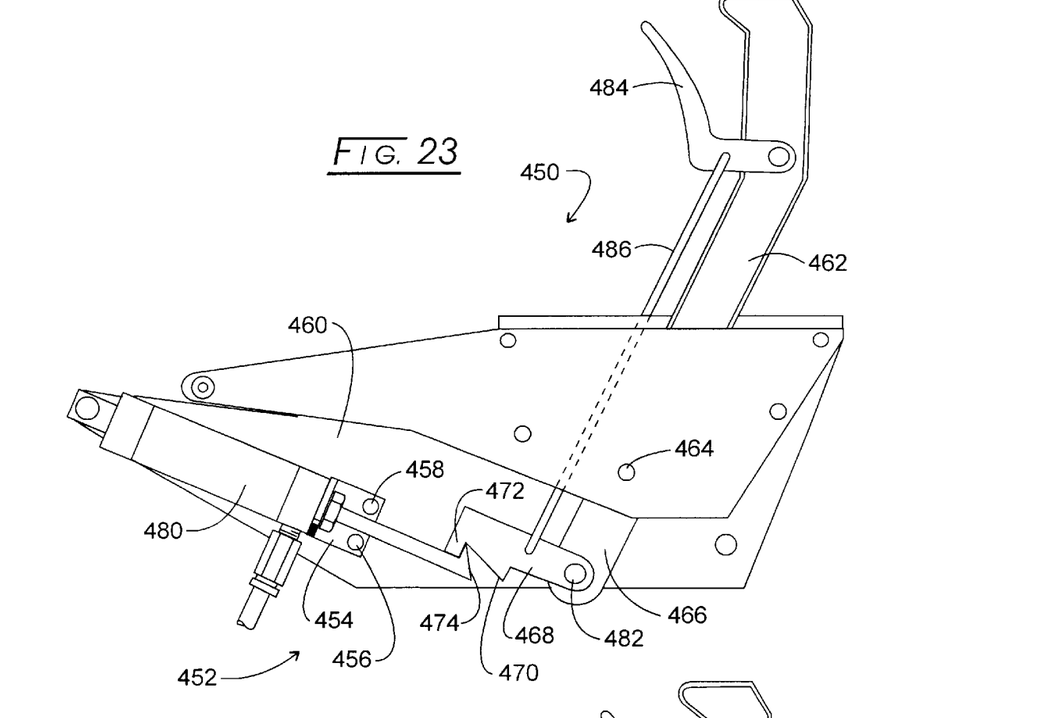
FIG. 23 is a side view of a side mount shifter with an alternative pneumatic actuator attached.

Shown in FIG. 23 is reverse pattern side mount shifter 450 with alternative pneumatic ratchet actuator 452. Actuator 452 is mounted to shifter 450 by bracket 454 by screws 456 and 458. Bracket 454 is connected to shifter base 460. Handle 462 shifts the shifter in a reverse pattern. Shifter handle 462 extends through the shifter and rotates about pivot pin 464. Shifter handle extension 466 has pivot bar 468 with teeth 470 and 472 that contact pawl 474 pulling the handle 462 rearward when air or $CO_2$ is applied to cylinder 480. Pivot bar 468 pivots at pin 482. Pivot bar 468 is lifted by lever 484 through rod 486. The action of pneumatic ratchet actuator 452 is the same as pneumatic ratchet actuator 240 in FIG. 15.

Figure 24:
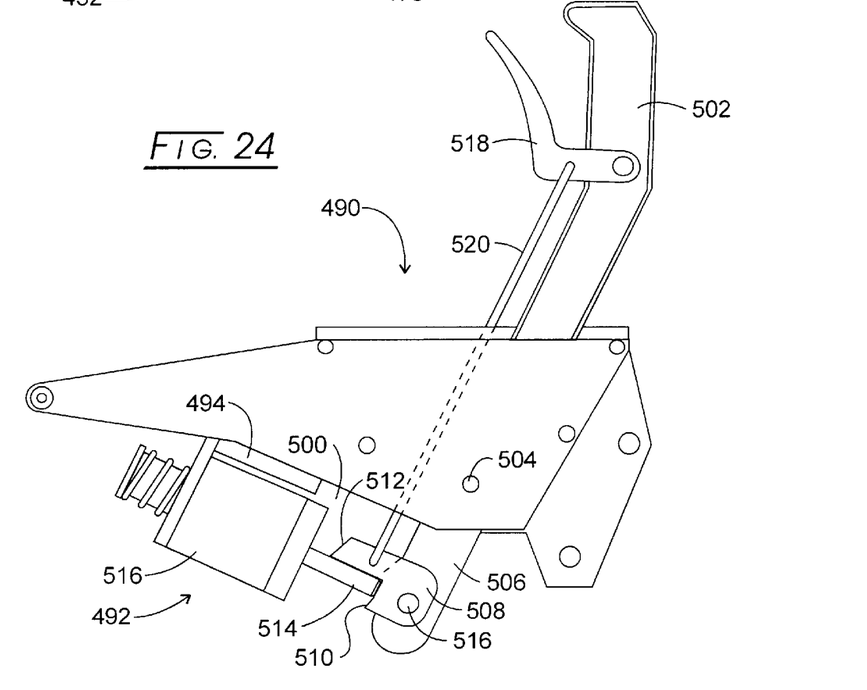
FIG. 24 is a side view of a side mount shifter with an alternative solenoid actuator attached.

Shown in FIG. 24 is forward pattern side mount shifter 490 with an alternative solenoid actuator 492. Actuator 492 is mounted to shifter 490 by bracket 494. Bracket 494 is connected to shifter base 500. Handle 502 shifts the shifter in a forward pattern. Shifter handle 502 extends through the shifter and rotates about pivot pin 504. Shifter handle extension 506 has pivot bar 508 with teeth 510 and 512 that are contacted by the tip of rod 514 of solenoid 516 pushing handle 502 forward when voltage is applied to solenoid 514. Pivot bar 508 pivots at pin 516. Pivot bar 508 is lifted by lever 518 through rod 520. The action of solenoid actuator 492 is the same as actuator 340 in FIG. 18.

The description herein relates specifically to a three-speed transmission shifter actuator. However, it is to be understood that adding more teeth to the shifter ratchet actuator assembly could activate any number of gears. The disclosure herein is illustrative of the present invention which should be understood to include various variations, modifications, and equivalents to those disclosed herein, as those skilled in the art will appreciate. In this application, all references are incorporated herein by reference.

I claim:

1. For use in a multi-geared vehicle equipped with an in-line shifter having a front, a rear, a side, and an upstanding shift handle, and which shifter shifts the vehicle forward gears in a forward or reverse pattern, a shifter assembly which comprises:

a single rod and piston assembly connected at its distal end to said vehicle and connected at its proximal end to a ratchet-action mechanism which mechanism activates said shift handle, said ratchet-action mechanism as activated by said assembly ratcheting said handle for shifting said vehicle through its forward gears, said shifter assembly having handle arc accommodation.

2. The shifter assembly of claim 1, wherein said arc accommodation comprises one or more of: either said rod and piston assembly, said ratchet-action mechanism, or both being pivotally connected; or said ratchet-action mechanism being pivotally connected to said handle.

3. The shifter assembly of claim 1, wherein said rod and piston assembly distal end is attached to a bracket.

4. The shifter assembly of claim 3, wherein said bracket is attached to said in-line shifter at its front, at its rear, or at its side.

5. The shifter assembly of claim 1, wherein said rod and piston assembly comprises a solenoid.

6. The shifter assembly of claim 1, wherein said rod and piston assembly is pneumatically actuated.

7. The shifter assembly of claim 1, wherein said ratchet-action mechanism is connected to said shift handle.

8. The shifter assembly of claim 1, wherein said ratchet-action mechanism comprises: a bolt attached to said rod of said rod and piston assembly and having a handle for cocking said bolt into position at first gear of said vehicle after all of the forward gears have been accessed, said bolt also having a plurality of longitudinally-offset recesses which are adapted to receive the rod of said rod and piston assembly, said rod extending when said rod and piston assembly is actuated for pushing said bolt into said shift handle to shift said vehicle and retracting thereafter, said bolt being biased so that it rotates after said rod is retracted to expose another of said recesses for said rod to push said bolt into said shift handle subsequent times to shift said vehicle through its forward gears.

9. The shifter assembly of claim 1, wherein said rod and piston assembly comprises a solenoid and said ratchet-action mechanism comprises: a pivot bar pivotally secured at its lower end to the vehicle and biasedly pivotally attached to a slotted toothed bar, said rod of said rod and piston assembly being attached to said pivot bar, said shift handle having a pawl which extends through said slot and engages said teeth of said slotted toothed bar; whereby when said rod is retracted by actuation of said rod and piston assembly, the slotted bar pulls said shift handle to shift the vehicle, and when said rod is extended after said shift the pawl is ratcheted to the next tooth for pulling said shift handle again to shift, there being adequate teeth for shifting said vehicle through its forward gears.

10. The shifter assembly of claim 1, wherein said rod and piston assembly is gas-activated and is pivotally attached to said vehicle at its cylinder end and attached to a slotted toothed bar at its other end, said shift handle having a pawl which extends through said slot and engages said teeth of said slotted toothed bar, whereby when said rod is retracted by actuation of said rod and piston assembly, the slotted bar pulls said shift handle to shift the vehicle, and when said rod is extended after said shift the pawl is ratcheted to the next tooth for pulling said shift handle again to shift, there being adequate teeth for shifting said vehicle through its forward gears.

11. The vehicle shifter assembly of claim 1, wherein said rod and piston assembly is gas-activated and is fixedly attached at its cylinder end to said vehicle, said rod having a toothed bar affixed to its end, said shift handle having a corresponding toothed bar pivotally attached thereto which has a handle for resetting it after the vehicle has been shifted through its forward gears, one of said toothed bars having multiple teeth corresponding to the number of gears of said vehicle, whereby the teeth of said rod toothed bar engage the teeth of said shift handle toothed bar for pulling said shift handle when said rod and piston assembly is actuated, said teeth of said toothed bars ratcheting into subsequent tooth engagement for continuing to shift the vehicle through its forward gears.

12. The vehicle shifter assembly of claim 1, wherein said shift handle retains a pivotally-mounted toothed lever which rotates downward after the rod of the rod and piston assembly has pushed the shift handle to shift the vehicle so that its tooth is next contacted by said rod for shifting the vehicle again.

13. The vehicle shifter assembly of claim 1, wherein for a reverse pattern shifter, the shifter assembly is mounted to the side of the in-line shifter, wherein said shift handle retains a pivotally-mounted toothed lever which rotates downward after the rod of the rod and piston assembly has pushed the shift handle to shift the vehicle so that its tooth is next contacted by said rod for shifting the vehicle again.

14. A method for shifting a multi-geared vehicle equipped with an in-line shifter having a front, a rear, a side, and an upstanding shift handle, and which shifter shifts the vehicle forward gears in a forward or reverse pattern, which comprises: actuating a shifter assembly a select number of times to shift the vehicle through its forward gears, said shifter assembly comprising a single rod and piston assembly connected at its distal end to said vehicle and connected at its proximal end to a ratchet-action mechanism which mechanism activates said shift handle, said ratchet-action mechanism as activated by said assembly ratcheting said handle for shifting said vehicle through its forward gears, said shifter assembly having handle arc accommodation.

15. The method of claim 14, wherein arc accommodation is provided by one or more of: either said rod and piston assembly, said ratchet-action mechanism, or both being pivotally connected; or said ratchet-action mechanism being pivotally connected to said handle.

16. The method of claim 14, which includes attaching said rod and piston assembly distal end to a bracket.

17. The method of claim 16, which includes attaching said bracket to said in-line shifter at its front, at its rear, or at its side.

18. The method of claim 14, wherein said rod and piston assembly is provided to be a solenoid.

19. The method of claim 14, wherein said rod and piston assembly is provided to be pneumatically actuated.

20. The method of claim 14, wherein said ratchet-action mechanism is provided to be: a bolt attached to said rod of said rod and piston assembly and having a handle for cocking said bolt into position at first gear of said vehicle after all of the forward gears have been accessed, said bolt also having a plurality of longitudinally-offset recesses which are adapted to receive the rod of said rod and piston assembly, said rod extending when said rod and piston assembly is actuated for pushing said bolt into said shift handle to shift said vehicle and retracting thereafter, said bolt being biased so that it rotates after said rod is retracted to expose another of said recesses for said rod to push said bolt into said shift handle subsequent times to shift said vehicle through its forward gears.

* * * * *